United States Patent
Dennett et al.

(10) Patent No.: US 9,454,433 B2
(45) Date of Patent: *Sep. 27, 2016

(54) ADAPTIVE REBUILD SCHEDULING SCHEME

(71) Applicant: International Business Machines Corporation, Armonk, NY (US)

(72) Inventors: Christopher M. Dennett, Houston, TX (US); Farnaz Toussi, Minneapolis, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 57 days.

This patent is subject to a terminal disclaimer.

(21) Appl. No.: 14/301,641

(22) Filed: Jun. 11, 2014

(65) Prior Publication Data

US 2015/0301895 A1    Oct. 22, 2015

Related U.S. Application Data

(63) Continuation of application No. 14/255,010, filed on Apr. 17, 2014.

(51) Int. Cl.
*G06F 11/00* (2006.01)
*G06F 11/10* (2006.01)

(52) U.S. Cl.
CPC ......... *G06F 11/1092* (2013.01); *G06F 11/108* (2013.01)

(58) Field of Classification Search
CPC .................................................. G06F 11/1092
See application file for complete search history.

(56) References Cited

U.S. PATENT DOCUMENTS

| | | | | |
|---|---|---|---|---|
| 5,278,838 A | | 1/1994 | Ng et al. | |
| 5,680,539 A | * | 10/1997 | Jones | G06F 11/1435 711/114 |
| 6,647,514 B1 | * | 11/2003 | Umberger | G06F 11/1092 714/42 |
| 7,434,095 B2 | * | 10/2008 | Tanaka | G06F 11/1084 714/6.24 |
| 7,562,249 B2 | * | 7/2009 | Daikokuya | G06F 11/1076 714/6.22 |
| 7,979,635 B2 | * | 7/2011 | Bates | G06F 11/1084 711/114 |
| 8,201,018 B2 | | 6/2012 | Navarro et al. | |

OTHER PUBLICATIONS

U.S. Appl. No. 14/255,010, Entitled "Adaptive Rebuild Scheduling Scheme", Filed Apr. 17, 2014.
NPL_Appendix P: List of IBM Patents or Patent Applications Treated as Related, Entitled "Adaptive Rebuild Scheduling Scheme", Filed Jun. 11, 2014.

* cited by examiner

*Primary Examiner* — Yolanda L Wilson
(74) *Attorney, Agent, or Firm* — Patterson + Sheridan, LLP

(57) ABSTRACT

Method and apparatus for redundant array of independent disks (RAID) recovery are disclosed. In one embodiment, a RAID controller schedules requests to rebuild failed drives based on the wear state of secondary drives and input/output (I/O) activity. The controller may be configured to assign higher scheduling priority to rebuild requests only when necessary, so as to reduce the time needed for the rebuild and to avoid affecting performance of the RAID system. In particular, the controller may give higher priority to rebuild requests if secondary drive failure is likely. In addition, the controller may determine when write-intensive periods occur, and assign lower priority to rebuild requests during such periods.

8 Claims, 3 Drawing Sheets

ADAPTIVE REBUILD SCHEDULING SCHEME

CROSS-REFERENCE TO RELATED APPLICATIONS

This application is a continuation of co-pending U.S. patent application Ser. No. 14/255,010, filed Apr. 17, 2014. The aforementioned related patent application is herein incorporated by reference in its entirety.

BACKGROUND

1. Field of the Invention

The present invention relates to data storage systems which provide fault tolerance, such as redundant array of independent disks (RAID), and more specifically, to an adaptive rebuild scheduling scheme.

2. Description of the Related Art

RAID is a storage technology in which data can be distributed across multiple drives to provide fault tolerance, among other things. When one drive in a RAID system fails, data may be recovered from other drives in the RAID system, referred to herein as "secondary drives." A number of techniques are known for RAID recovery, also referred to herein as "rebuilding" the RAID volume.

The RAID recovery process can have a significant impact on ordinary input/output (I/O) performance. The impact of RAID recovery has increased as the storage capacity of RAID drives has increased, necessitating longer rebuild times. As a result, I/O performance can be reduced for hours, or even days, during RAID recovery. Another problem associated with RAID recovery is the possibility of failure of secondary drives. Such secondary failure can result in complete data loss, as it may become impossible to recover data using the failed secondary drives.

SUMMARY

According to one embodiment of the present invention, a method is provided for data recovery in a storage system in which fault tolerance in the storage system is provided using multiple copies of data. The method generally includes receiving a request to rebuild a failed drive in the storage system. The method further includes determining states of one or more secondary drives associated with the rebuild request. In addition, the method includes, if one or more secondary drives are in a failing state, prioritizing a rebuild operation over read and write operations, and if no secondary drive is in a failing state, delaying the rebuild operation if the storage system is in a write-intensive period.

Further embodiments of the present invention include a storage system controller configured to carry out the above method, and a non-transitory computer-readable storage medium comprising instructions that cause a storage system controller to carry out the above method.

DETAILED DESCRIPTION

Embodiments disclosed herein provide techniques for data recovery in a storage system. Redundant array of independent disks (RAID) is used herein as a reference example of such a storage system in which fault tolerance in is provided using multiple copies of data. In one embodiment, a RAID controller schedules requests to rebuild a failed drive ("rebuild requests") in a dynamic manner that accounts for the host input/output (I/O) impact on rebuild time and the chances of secondary drive failure. The controller may be configured to assign higher scheduling priority to rebuild requests only when necessary, so as to reduce the time needed for rebuilding and to reduce the impact on performance of the RAID system.

One case where a higher priority may be assigned to a rebuild request occurs when a secondary drive failure is statistically likely. As discussed, secondary drive failure can result in complete data loss. Accordingly, the controller may give higher priority to rebuild requests if secondary drive failure is likely. In one embodiment, the controller may determine whether secondary drive failure is likely based on drive Self-Monitoring, Analysis, and Reporting Technology (S.M.A.R.T.) report data, as discussed in greater detail below. This explicit consideration of the likelihood of secondary drive failure is in contrast to prior techniques, which specified fixed periods during which rebuilds had to be completed to ensure data recovery during the fixed periods. By explicitly considering the likelihood of secondary drive failure, rebuild operations may be delayed if secondary drive failure is unlikely so as not to affect system performance, rather than performed within a given fixed period during which system performance would be negatively affected.

In another embodiment, rebuild operations may be delayed based on input/output (I/O) activity monitored by the controller. In flash-based solid state drives (SSDs) in particular, write operations usually take longer than read operations. As a result, scheduling rebuild operations during write-intensive periods, such as during garbage collection, can negatively affect performance of the RAID system, as well as the time required for the rebuild operations themselves to complete. Garbage collection is a process where SSD pages with good data are read from blocks (comprising multiple pages) which include some stale pages. The good data is then re-written to empty blocks. Experience has shown that, with RAID 5 systems, performing rebuilds during garbage collection can increase the time required to complete the rebuilds by two to eight times. In one embodiment, the controller may determine when write-intensive periods occur, and assign lower priority to rebuild requests during such periods so that rebuild operations are delayed until after the write-intensive periods.

Figure 1:
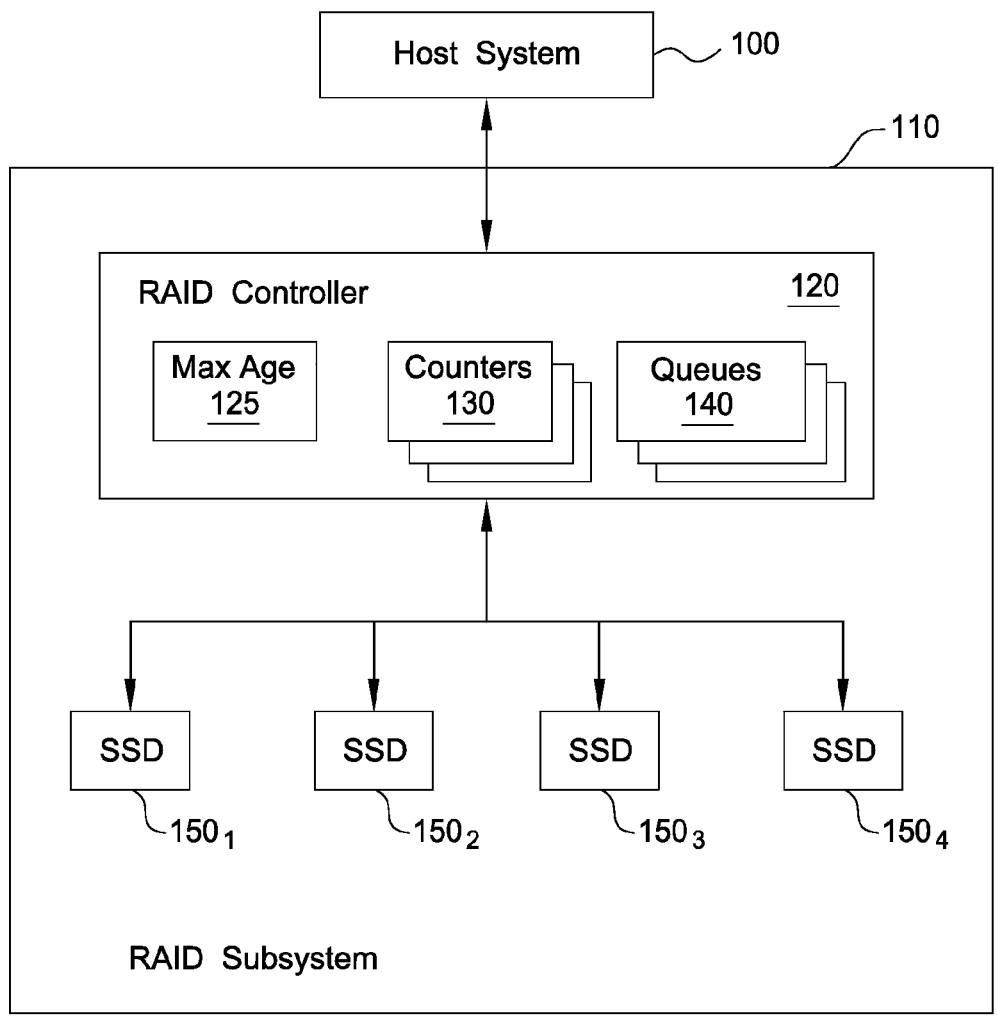
FIG. 1 illustrates a RAID system, according to an embodiment.

FIG. 1 illustrates a RAID system 110, according to an embodiment. As shown, the RAID system 110 includes a RAID controller 120 and SSDs $150_{1-4}$. The SSDs $150_{1-4}$ may be any flash memory-based devices, including commercially available SSD drives. The controller 120 is a hardware apparatus that includes a processor (not shown) and provides an interface between the SSDs $150_{1-4}$ and host computer system 100. In particular, the controller 120 may be configured as an I/O controller that manages I/O communications between host computer system 100, which issues the I/Os, and the SSDs $150_{1-4}$, which service the I/Os. The I/Os themselves may include typical read and write I/Os, also referred to herein as read and write requests, as well as rebuild I/Os, also referred to herein as rebuild requests, for rebuilding lost data.

Illustratively, the controller 120 is configured to store a maximum age 135 of rebuilds to avoid starvation; three counters 130 to keep track of read, write, and rebuild requests that have been dispatched; and three queues 140 to keep track of outstanding read, write, and rebuild requests. The maximum age, counters, and queues may be implemented at the hardware or software level or a combination of both where, the software will be running on the controller's 120 processor.

In addition to the maximum age, counters, and queues, the controller 120 may maintain a log of the wear status of drives in the RAID system 110. In one embodiment, such wear status may be obtained from S.M.A.R.T. reports sent by the SSDs $150_{1-4}$ to the host 100. S.M.A.R.T. is a monitoring technology for detecting and reporting indicators of drive reliability. With S.M.A.R.T., the SSDs $150_{1-4}$ report various analytical information which may be analyzed to predict whether drive failure is likely. As shown, the controller 120 is in communication with, and situated between, the host 100 and the SSDs $150_{1-4}$. The controller 120 may thus intercept S.M.A.R.T. reports transmitted from the SSDs $150_{1-4}$ to the host 100 and retrieve necessary data therefrom to include in the log of wear status. In a particular embodiment, the controller 120 may intercept wear status reports (e.g., Media wear out indicator or SSD life left), which are S.M.A.R.T. attributes generated by SSDs, and keep a log wear status for determining probability of second failure.

As discussed in greater detail below, the controller 120 may schedule the requests in the read, write, and rebuild queues 140 so as (1) to prioritize rebuild requests when secondary drive failure is statistically likely; and (2) to delay rebuild requests during write-intensive periods, except to avoid starvation of the rebuild requests, i.e., indefinite blocking of the rebuild requests. Here, the controller 120 may identify the write-intensive periods based on a comparison of the number of reads and writes in the read and write queues, and the controller may avoid starvation by prioritizing a rebuild request whose age exceeds the maximum rebuild age 125.

In one embodiment, the controller 120 may schedule read, write, and rebuild requests according to the following pseudo-algorithm, discussed is in greater detail below:

```
Check readQ, writeQ, rebuildQ for work
If only rebuild outstanding
   dispatch rebuild
else if read or write and rebuild outstanding
   check wear_stat of all good drives
   If any of the drives' wear_stat indicates high probability of failure then
      rebuild priority = higher than read and write
   else chance for secondary failure is low then
      If write_count > read_count then workload is in write intensive
period
         If rebuild_age > max_age then potential starvation
            rebuild priority = higher than read and write
            rebuild_age = 0
         else rebuild can be delayed
            rebuild priority = less than write
            increment rebuild_age
      else if write_count <= read_count then workload is not in write intensive
period
         rebuild priority = read priority
dispatch based on priority and same priority tie breaker e.g. round-robin
or FCFS
if read or write dispatched then
   increment read or write counter
If rebuild dispatched then
   reset read & write counters if they are > 0
      else if they are 0 then reset not necessary
```

Figure 2:
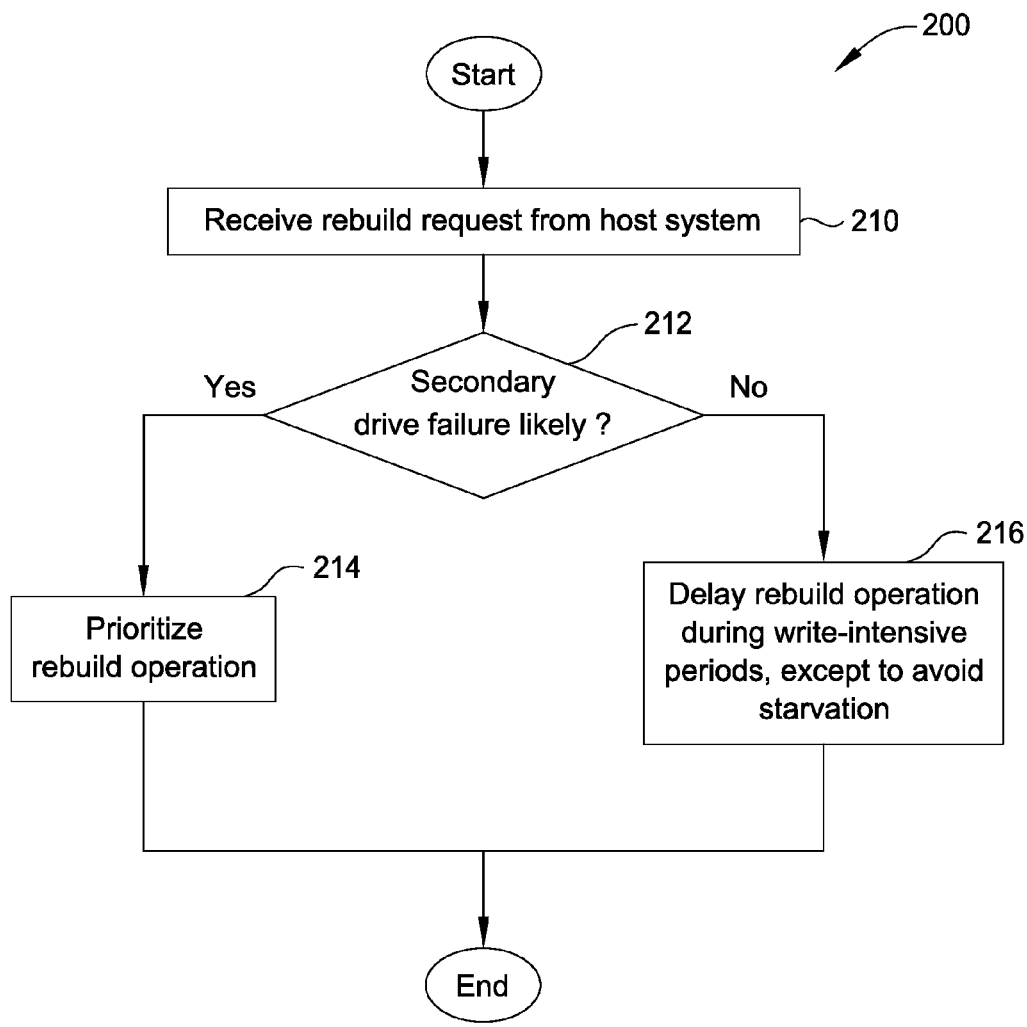
FIG. 2 illustrates, at a high level, a method for RAID recovery, according to an embodiment.

FIG. 2 illustrates, at a high level, a method 200 for RAID recovery, according to an embodiment. Although the method steps are described in conjunction with FIG. 1, persons skilled in the art will understand that any system configured to perform the method steps, in any order, falls within the scope of the present invention. As shown, the method 200 begins at step 210, where RAID controller 120 receives a rebuild request from host system 100. The host may generally issue read and write I/Os during normal operation, as well as rebuild I/Os which are I/Os for rebuilding lost data. The received I/O requests may be queued in the appropriate read, write, and rebuild queues 140. In addition, the controller 120 may update the counters 120 for dispatched read, write, and rebuild requests as I/O requests are dispatched to SSDs.

At step 212, the controller 120 determines whether secondary drive failure is statistically likely. As discussed, secondary drive failure can cause complete data loss, and is therefore to be avoided. In one embodiment, the controller 120 may maintain a log of wear status of drives in the RAID system 110. The wear status may be obtained through, e.g., S.M.A.R.T. reports received from the SSDs $150_{1-4}$. To determine whether secondary drive failure is likely, the controller 120 examines wear status to determine if any secondary drive is in a failing state. In one embodiment, the controller 120 may determining whether an SSD is in a failing state using a media wearout indicator or a SSD life left indicator in S.M.A.R.T. reports. The media wearout indicator is generated by each SSD and equals 1 if the SSD is in a failing state. The SSD life left indicator is also generated by each SSD and equals 1 if there are not enough flash blocks remain in service for the SSD to operate properly, indicating a failing state.

If the controller 120 determines that secondary drive failure is likely, then at step 214, the controller 120 prioritizes the rebuild operation. That is, in scheduling the outstanding requests stored in the read, write, and rebuild queues 140, the controller 120 assigns a higher priority to rebuild requests in the rebuild queue than to read and write requests in the read and write queues. For example, let there be three priority levels 1-3, with 1 being the lowest priority and 3 being the highest priority. In such a case, the controller 120 may set the priority of rebuild requests to 3, the priority of write requests to 2, and the priority of read requests to 1. Alternatively, there may only be two priority levels 1-2, and the rebuild requests may be assigned the higher priority of 2 while the read and write requests are assigned the lower priority of 1. The controller 120 is configured to dispatch requests to the SSDs $150_{1-4}$ according to the priority of the requests. Continuing the example above, the controller 120 may first dispatch rebuild requests, which have the highest priority, and then dispatch write and read requests, which have lower priorities. If the write priority is set higher than the read priority, then write requests would also be dispatched before read requests.

If the controller 120 determines that secondary drive failure is not likely, then at step 216, the controller 120 delays rebuild operations during write-intensive periods, except to avoid starvation of rebuild requests. The delay may be achieved by, e.g., prioritizing write requests over rebuild requests so that the write requests are dispatched to the SSDs $150_{1-4}$ before the rebuild requests. The controller 120 may determine whether the RAID system 110 is in a write-intensive period based on the number of dispatched reads and writes indicated by the counters 130. In one embodiment, a write-intensive period may be defined as any period where the write counter is greater than the read count. In SSDs in particular, write operations take longer than read operations, and the RAID system 110 is likely to be busy during write-intensive periods. Accordingly, the controller 120 may delay rebuild operations during such periods and simply increase age of the rebuild that is maintained to keep track of how long the rebuild has been outstanding. In contrast, during read-intensive periods when the number of read requests is greater than the number of write requests, the controller 120 may assign the same priority to rebuild requests that is assigned to read requests, as the RAID system 110 is more likely to be free during the read-intensive periods. Experience has shown that rebuild operations can be performed more quickly during such read-intensive period.

Before delaying a rebuild, however, the controller 120 may first check the age of the rebuild request to determine whether the age is greater than the maximum rebuild age 125. If such is the case, the controller 120 may assign a higher priority to the rebuild request so as to avoid starvation of the request. That is, the controller 120 does not delay the rebuild further if the rebuild request has already been outstanding for longer than the maximum rebuild age 125.

Figure 3:
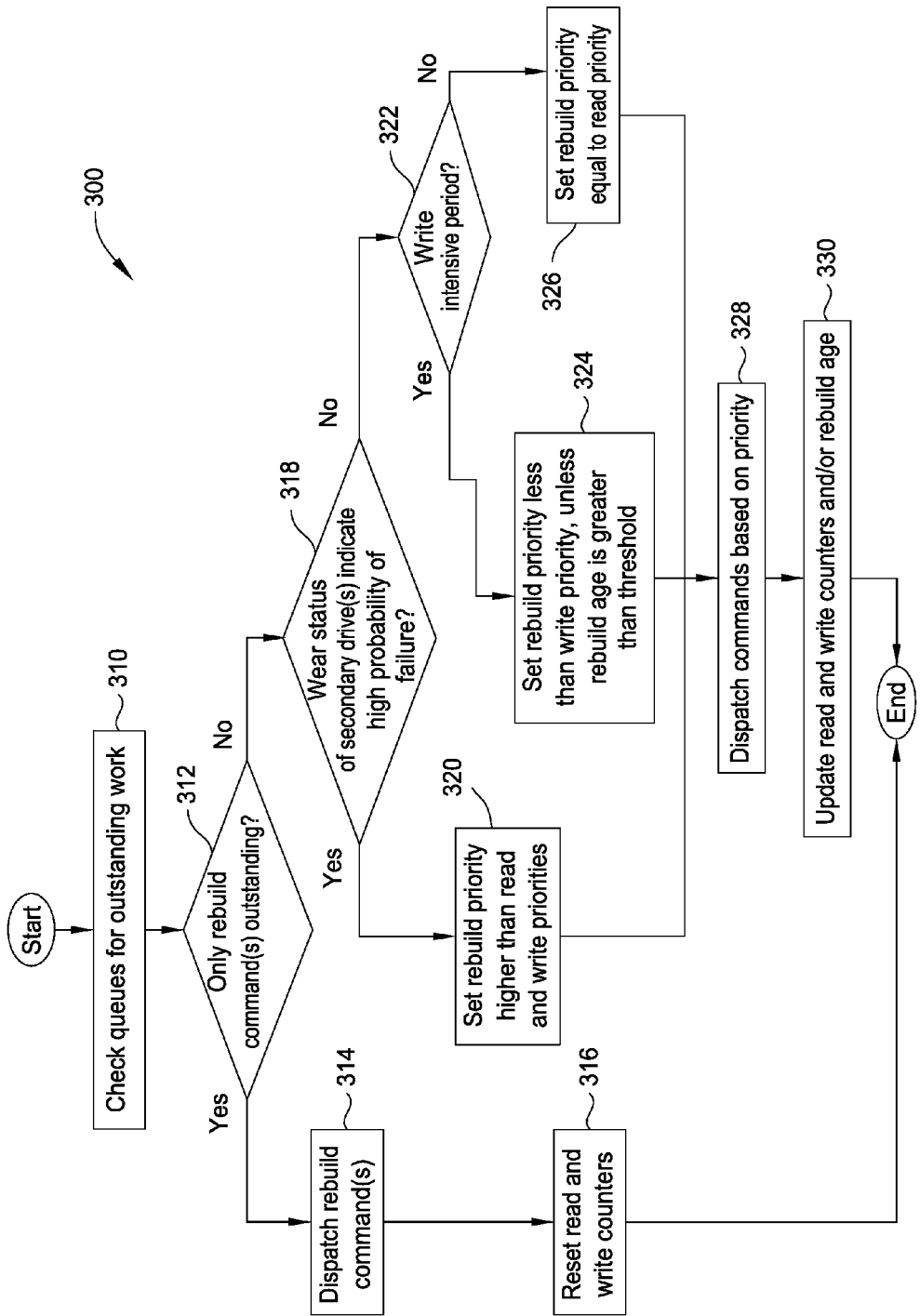
FIG. 3 illustrates a more detailed flowchart of a method for RAID recovery, according to an embodiment.

FIG. 3 illustrates a more detailed flowchart of a method 300 for RAID recovery, according to an embodiment. Although the method steps are described in conjunction with FIG. 1, persons skilled in the art will understand that any system configured to perform the method steps, in any order, falls within the scope of the present invention. Further, although shown as sequential steps, one or more steps of the method 300 may actually be performed in a sort of "infinite loop" in which the RAID controller 120 continuously checks its queues, makes appropriate scheduling decisions, and dispatches I/Os to be serviced according to the scheduling decisions.

As shown, method 300 begins at step 310, where the RAID controller 120 checks the queues 140 for outstanding work. As discussed, the queues 140 include read, write, and rebuild queues which store in first-come-first-served order read, write, and rebuild requests, respectively, that are received from the host 100. The controller 120 checks these queues 140 for outstanding requests, i.e., received requests which have not yet been dispatched to the SSDs $150_{1-4}$, which service the requests.

At step 312, the controller 120 determines whether there are only rebuild request(s) outstanding. That is, the controller 120 determines whether there are rebuild request(s) in the rebuild queue and no read or write requests in the read and write queues, respectively. If such is the case, then there is no need to delay the rebuild request, and at step 314, the controller 120 dispatches the rebuild request. In addition, at step 316, the controller 120 resets the read and the write counters.

If there are not only rebuild request(s) outstanding, i.e., if there are also outstanding read or write requests, then at step 318, the controller 120 determines if the wear status of secondary drive(s) indicate a high probability of failure of the secondary drive(s). As discussed, data loss may result if secondary drive(s) fail. The controller 120 is configured to examine the log for secondary drive failure and prevent data loss. In one embodiment, the wear status, and the corresponding failure likelihood, of the secondary drive(s) may be determined using information obtained from S.M.A.R.T. reports, such as wear leveling count. In one embodiment, the controller 120 may determine if the wear status of secondary drive(s) indicate a high probability of secondary drive failure based on the failing (or non-failing) state of SSDs indicated by the media wearout indicator or the SSD life left indicator in the S.M.A.R.T. reports. As discussed, the media wearout indicator is generated by each SSD and equals 1 if the SSD is in a failing state, while the SSD life left indicator is generated by each SSD and equals 1 if there are not enough flash blocks remain in service for the SSD to operate properly.

If the controller 120 determines that another drive is failing, then at step 320, the controller 120 sets the rebuild priority higher than read and write priorities. In the case of three scheduling priority levels 1-3, with 1 being the lowest priority and 3 being the highest priority, the controller 120 may assign a priority of 3 to rebuild requests where another drive is in a failing state, a priority of 2 to write requests, and a priority of 1 to read requests. Alternatively, two scheduling priority levels 1-2 may be used, with 2 being a higher priority than 1, and the controller 120 may assign a priority of 2 to the rebuild requests and a priority of 1 to the read and write requests.

If the controller 120 determines that no other drive is in a failing state, then at step 322, the controller 120 determines whether the RAID system 110 is in a write-intensive period. The controller 120 may determine whether the RAID system 110 is in a write-intensive period based on the values of the counters 130. In one embodiment, a write-intensive period may be defined as any period in which the number of writes is greater than the number of reads. Such write-intensive periods can increase the chance of garbage collection in SSD drives, which typically results in high internal SSD traffic which will interfere with host I/O requests.

If the RAID system 110 is in a write-intensive period, then at step 324, the controller 120 sets the rebuild priority less than the write priority, unless the rebuild age is greater than a threshold value. As discussed, scheduling rebuild operations during write-intensive periods can result in reduced performance, as well as increase the length of the rebuild operation itself. The controller 120 thus sets the rebuild priority less than the write priority so as to delay dispatching rebuild requests (and therefore delay the rebuild operation) during the write-intensive period. Continuing the example above with scheduling priority levels 1-3, the controller 120 may assign the lowest priority 1 to the rebuild requests, the highest priority 3 to the write requests, and the intermediate priority 2 to read requests during the write-intensive period. If only two scheduling priorities levels 1-2 are used, then the controller 120 may assign the higher priority 2 to the write requests and the lower priority 1 to the read and rebuild requests.

The controller 120 does not delay a rebuild operation, however, if the age of a rebuild request is greater than the threshold maximum rebuild delay 125. That is, a rebuild is not delayed further if the rebuild request has already been outstanding for longer than the maximum rebuild age 125. In such a case, the controller 120 assigns a higher priority to the rebuild request so as to avoid starvation of the rebuild request.

If the RAID system 110 is not in a write-intensive period, then at step 326, the controller 120 sets the rebuild priority equal to the read priority. As discussed, the write-intensive period may be determined based on the values of the counters 130, with the write-intensive period being a period in which the number of writes is greater than the number of reads. Conversely, the controller 120 may determine that the RAID system 110 is not in a write-intensive period if the number of write requests is less than or equal to the number of read requests. In such a case, the SSDs 150 are more likely to be free as there is typically less traffic during read-intensive periods. Performance models and experimental data have shown that rebuild operations take less time to complete during such non-write-intensive periods. Consequently, the controller 120 sets the rebuild priority equal to the read priority in such a case, as there is no need to delay the rebuild requests.

At step 328, the controller 120 dispatches requests in the queues 120 based on priority to drives of the RAID system 110 (i.e., SSDs $150_{1-4}$). The controller 120 dispatches higher priority requests before lower priority requests. In addition, the controller 120 may dispatch requests with the same priority according to a tie-breaker scheduling technique, such as first-come-first-served or a round-robin scheduling technique. The SSDs $150_{1-4}$ drives then service the dispatched requests.

At step 330, the controller 120 updates read, write, and/or rebuild counters. If a read or write request is dispatched, then the controller 120 updates the read or write counter, respectively, by incrementing those counters. The controller 120 may further update the age of the rebuild request by, e.g., incrementing the age. If a rebuild request is dispatched, the controller 120 resets the read and write counters. The read and write counters are reset for the next rebuild request after any given rebuild request is dispatched so that the correct scheduling can be obtained for the next rebuild request.

Advantageously, techniques disclosed herein delay rebuild requests until it becomes necessary to dispatch such requests, as determined based on several conditions. Doing so reduces the impact on performance and reduces time required to perform rebuild operations after the delay period. One instance where rebuild requests need to be dispatched (without delay) is when secondary drive failure is likely. In such cases, the RAID controller prioritizes rebuild requests over read and writes requests so as to prevent data loss. In addition, techniques disclosed herein account for I/O activity by prioritizing write requests over rebuild requests during write-intensive periods, except to avoid starvation of the rebuild requests. In flash-based SSDs in particular, write operations take longer than read operations, and techniques disclosed herein avoid scheduling rebuilds during write-intensive periods so as to reduce the impact on performance and the time required to perform the rebuild.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method for data recovery in a storage system in which fault tolerance in the storage system is provided using multiple copies of data, comprising:
   receiving a request to rebuild a failed drive in the storage system;
   determining states of one or more secondary drives associated with the rebuild request;
   if one or more of the secondary drives are in a failing state, prioritizing a rebuild operation over read and write operations; and
   if none of the secondary drives are in a failing state, delaying the rebuild operation if the storage system is in a write-intensive period.

2. The method of claim 1, further comprising,
   maintaining a counter for a number of dispatched write requests, a counter for a number of dispatched read requests, and a rebuild age for the rebuild request; and
   maintaining a queue of read requests, a queue of write requests, and a queue of rebuild requests.

3. The method of claim 2, further comprising, upon determining that only rebuild requests are outstanding, dispatching the outstanding rebuild requests and resetting the counter for the number of dispatched write requests and the counter for the number of dispatched read requests if the counter values are greater than 0.

4. The method of claim 2, wherein the rebuild operation is delayed, and the rebuild age incremented, until the rebuild age exceeds a threshold age.

5. The method of claim 2, wherein the write-intensive period is determined based on whether the number of write requests indicated by the counter for the number of dispatched write requests is greater than the number of read requests indicated by the counter for the number of dispatched read requests.

6. The method of claim 1, wherein delaying the rebuild operation includes assigning a scheduling priority to the rebuild request that is lower than scheduling priorities assigned to read and write requests.

7. The method of claim 1, wherein the storage system includes one or more solid-state drives (SSDs).

8. The method claim 1, wherein the states of the secondary drives are determined based on wear status reports issued by drives of the storage system.

* * * * *